(12) United States Patent
Tarta et al.

(10) Patent No.: US 10,185,736 B2
(45) Date of Patent: Jan. 22, 2019

(54) REPLICABLE DIFFERENTIAL STORE DATA STRUCTURE

(71) Applicant: MICROSOFT TECHNOLOGY LICENSING, LLC, Redmond, WA (US)

(72) Inventors: Mihail Gavril Tarta, Sammamish, WA (US); Gopal Kakivaya, Redmond, WA (US); Preetha Lakshmi Subbarayalu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 538 days.

(21) Appl. No.: 14/752,603

(22) Filed: Jun. 26, 2015

(65) Prior Publication Data
US 2016/0314162 A1 Oct. 27, 2016

Related U.S. Application Data

(60) Provisional application No. 62/153,506, filed on Apr. 27, 2015.

(51) Int. Cl.
*G06F 17/30* (2006.01)
(52) U.S. Cl.
CPC .. *G06F 17/30359* (2013.01); *G06F 17/30377* (2013.01); *G06F 17/30578* (2013.01)
(58) Field of Classification Search
CPC ......... G06F 17/30359; G06F 17/30327; G06F 17/30356; G06F 17/30362
See application file for complete search history.

(56) References Cited

U.S. PATENT DOCUMENTS 5,170,480 A * 12/1992 Mohan .............. G06F 17/30575
5,280,611 A    1/1994 Mohan et al.
(Continued)

OTHER PUBLICATIONS

Garg, et al., "A Nonblocking Coordinated Checkpointing Algorithm for Mobile Computing Systems", In International Journal of Computer Science Issues, vol. 7, Issue 3, No. 3, May 2010, pp. 41-46.
(Continued)

*Primary Examiner* — Etienne P Leroux
(74) *Attorney, Agent, or Firm* — Shook, Hardy & Bacon, L.L.P.

(57) ABSTRACT

In various embodiments, methods and systems for optimizing database transactions based on replicable differential data store data structure are provided. A write operation request, having a key for a write operation on a replicable differential store data structure, is accessed. An intent write lock on a differential state and a write lock on the key are acquired. The differential state comprises a result set of currently committing transactions. A transaction instance, of the write operation, is generated for a write set, the transaction instance comprising a modification to the key. The write-set comprises an uncommitted set of writes for in-flight transactions. A determination is made that the write operation is committed. A result of the transaction instance is persisted when the write operation is committed. It is contemplated that the differential state and a consolidated state can be merged, the consolidated state comprises a result set of previously committed transactions.

14 Claims, 15 Drawing Sheets

(56) References Cited

U.S. PATENT DOCUMENTS

| | | | |
|---|---|---|---|
| 5,983,225 A * | 11/1999 | Anfindsen | G06F 17/30362 |
| 6,339,772 B1 | 1/2002 | Klein et al. | |
| 7,206,964 B2 | 4/2007 | Moser et al. | |
| 7,305,386 B2 | 12/2007 | Hinshaw et al. | |
| 7,478,263 B1 | 1/2009 | Kownacki et al. | |
| 7,536,591 B2 | 5/2009 | Varadarajan et al. | |
| 8,442,938 B2 | 5/2013 | Ougarov et al. | |
| 8,489,655 B2 | 7/2013 | Aronovich et al. | |
| 8,799,213 B2 | 8/2014 | Wong et al. | |
| 2008/0294648 A1 | 11/2008 | Lin et al. | |
| 2009/0172327 A1 * | 7/2009 | Shavit | G06F 9/466 |
| | | | 711/163 |
| 2010/0281013 A1 * | 11/2010 | Graefe | G06F 17/30327 |
| | | | 707/715 |
| 2011/0107338 A1 | 5/2011 | Ylonen | |
| 2011/0153566 A1 * | 6/2011 | Larson | G06F 17/30356 |
| | | | 707/638 |
| 2014/0149353 A1 * | 5/2014 | Lee | G06F 17/30356 |
| | | | 707/639 |
| 2014/0279881 A1 | 9/2014 | Tan et al. | |

OTHER PUBLICATIONS

Ohene-Kwofie, et al., "O2-Tree: A Fast Memory Resident Index for NoSQL Data-Store", In Proceedings of IEEE 15th International Conference on Computational Science and Engineering, Dec. 5, 2012, pp. 50-57.

* cited by examiner

REPLICABLE DIFFERENTIAL STORE DATA STRUCTURE

CROSS-REFERENCE TO RELATED APPLICATIONS

This application claims priority to U.S. Provisional Application Ser. No. 62/153,506, filed Apr. 27, 2015, entitled "REPLICABLE DIFFERENTIAL STORE DATA STRUCTURE," which is incorporated herein by reference in its entirety.

BACKGROUND

Cloud computing platforms may offer building, deployment, management and durability support for different types of applications and services. In particular, database systems can be implemented within cloud computing platforms to store and organize data to support accessing, processing, and analyzing the data. Database systems operate with cloud computing platform architectures and resources that continue to change to improve support for the workloads carried out on the cloud computing platforms. As such, legacy database systems can include inherent attributes that limit compatibility with modern cloud computing platform architectures and resources.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein provide methods and systems for optimizing database transactions based on a replicable differential data store data structure. A write operation (e.g., an insert transaction or add transaction) request, having a key for a write operation on a replicable differential store data structure, is accessed. Upon accessing the write operation request, a replica operation instance for the write operation request is generated, where the replica operation instance includes one or more instances (e.g., redo instance and undo instance) comprising instructions for replication operations on a replica node. An intent write lock on a differential state and a write lock on the key are acquired. The differential state comprises a result set of currently committing transactions. Upon acquiring a write lock on the key, an extant inquiry operation that determines whether the key has been previously added to the index is performed, such that, an error message is returned when it is determined that the key has been previously been added. When the key has not been previously added, the write operation continues. The replica operation instance is communicated, such that, the replica operation instance is executable on a replica node.

In addition, a transaction instance (e.g., a transaction change), of the add transaction or insert transaction, is generated for a write set, the transaction instance comprising a modification to the key. The write-set comprises an uncommitted set of writes for an in-flight add transaction or insert transaction, such that, the in-memory and index portions of the replicable differential store data structure remain unchanged while the add transaction or insert transaction is not yet committed. A determination is made that the add transaction or insert transaction is committed and not aborted. A result set of the transaction instance is persisted into a differential state, when the add transaction or insert transaction is committed. The replica operation instance is simply discarded when the add transaction or insert transaction is aborted. It is contemplated that the differential state and a consolidated state can be merged, where the consolidated state comprises a result set of previously committed transactions.

BRIEF DESCRIPTION OF THE DRAWINGS

The present invention is described in detail below with reference to the attached drawing figures, wherein.

DETAILED DESCRIPTION

Figure 1A:
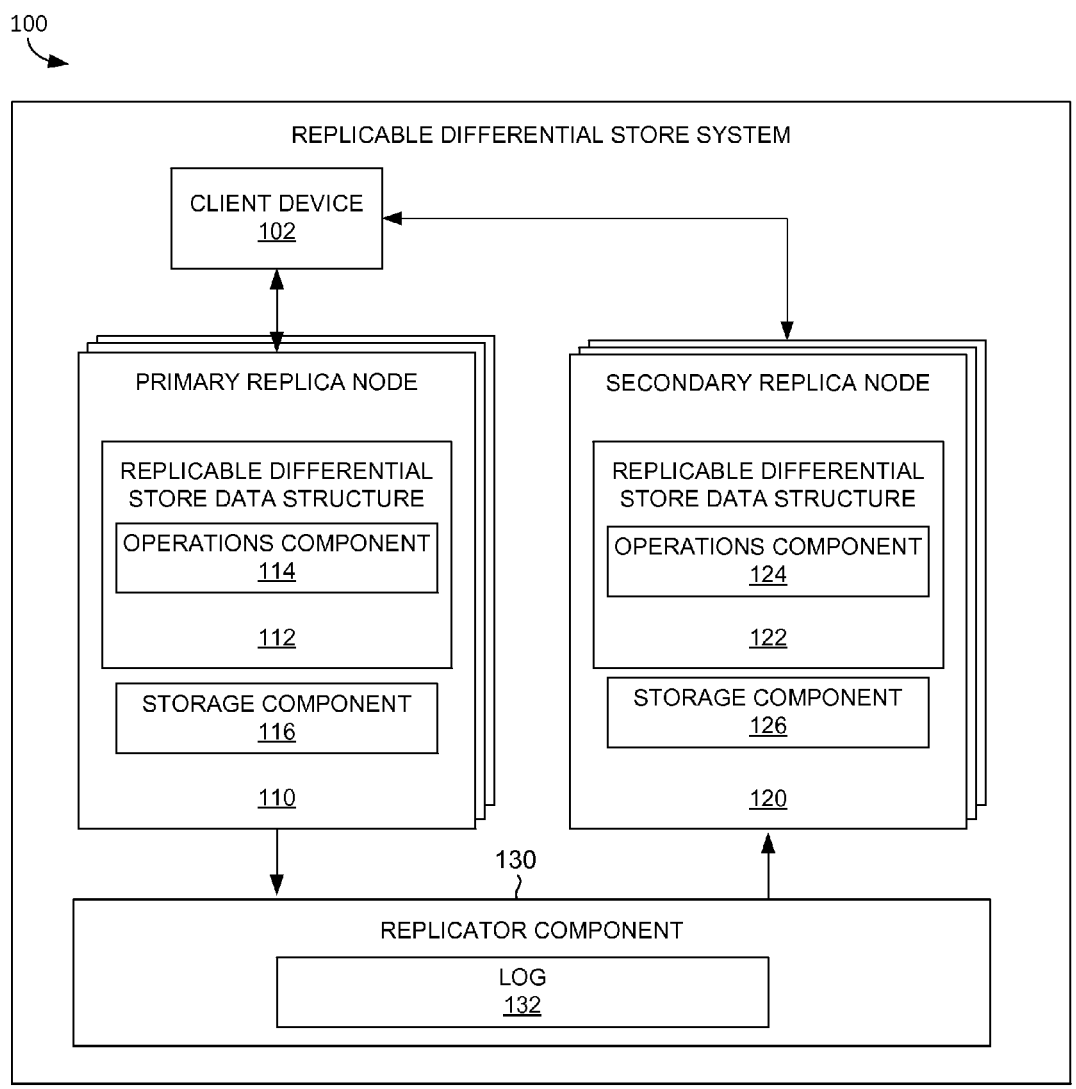
FIGS. 1A and 1B are block diagrams of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices and components of a replicable differential store data structure that supports optimizing data transactions based on a replicable differential store index and a replicable data store protocol. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Database systems store and organize data to support accessing, processing, and analyzing the data. Conventional database systems store data using several different types of data structures. Conventional data structures include inherent attributes that limit compatibility with modern cloud computing platform architecture and resources. By way of example, B-tree data structures can keep data sorted and allows searches, sequential access, insertions, and deletions. B-tree data structures can specifically be implemented with a paging scheme that supports different operations for data stored using the B-tree. A paging scheme facilitates storing and retrieving data from secondary storage for use in main memory based on same-size blocks called page. The paging scheme is implemented with a physical address space that is noncontiguous. In operation, when a transaction needs to update the data in the database, the disk pages (or blocks) containing the data items to be modified are first cached by a cache manager into main memory and then modified in the memory before being written back to the disk. The data which is modified in the cache can be copied back to the disk using in-place updating, where when a single copy of data items are maintained on disk, the updated data item on the disk is overwritten by the new value. In-place updating can cause random write patterns which are not optimized for solid state drives (SSD) now commonly used in cloud computing platforms.

In addition, conventional data structures are merely retrofitted with updates to work with modern architectures and resource in cloud computing platforms. While some retrofitted features can improve functionality, there still exist inherent attributes of the legacy data structure that do not fully optimize database transactions for modern cloud computing platforms. For example, conventional data structures are not constructed for workload awareness. In other words, the workload being modified is not a consideration of the data structure, which could otherwise provide improved performance on operations. In particular, database keys become cold as they become older, or said another way, usually the more recently used keys in cloud computing platforms are subject to modification. A data structure that is not workload aware would provide diminished performance when performing transactions that perform unnecessary reads and writes to disk storage. Further, conventional data structures do not support multi-threaded transactions to allow for transactions to be manipulated across different threads because certain transaction states are maintained in threads in local storage. In this regard, a cloud computing platform cannot take advantage of modern multi-core architectures. Also, conventional data structures are not constructed with inherent attributes for replication that involve communicating the data in the data structure so as to ensure consistency between redundant resources to improve reliability, fault-tolerance, and accessibility. As such, a database data structure that is designed with modern cloud computing platform as a backdrop can take advantage of the specific aspects of the cloud computing platform architecture and resources in order to optimize database transactions.

Embodiments of the present invention provide methods and systems for optimizing data transactions based on a replicable differential store data structure ("data structure"). The replicable differential store data structure includes a replicable differential store index ("index") and a replicable differential store protocol ("protocol") such that the data structure is compatible with improved cloud computing architectures and resources. The index improves the speed of data retrieval and the protocol includes a set of procedures that create and manipulate instances defined in the data structure. In particular, the protocol supports a multi-tiered transaction state storage system that is implemented as a write-set, a differential state, and a consolidated state of the data structure. The protocol specifically includes procedures that implement database operations, transactions, and results in different types of memory to improve transaction costs and efficiency. In particular, the protocol procedures can support commit operations, checkpoint operations, and consolidation operations for efficiently persisting transactions results in storage components. It is contemplated that different types of memory devices can be used as storage component. The data structure further supports replication based on replication procedures of the protocol to ensure consistency between redundant resources to improve accessibility and reliability. As such, the replicable differential storage data structure advantageously implements functionality that is optimized for the cloud computing platform.

Various terms are used throughout this description. Although more details regarding various terms are provided throughout this description, general definitions of some terms are included below to provide a clearer understanding of the ideas disclosed herein.

A version refers to an identifier for a record. Any modification of a key can produce a new record for that key. The new record is uniquely identified by a version that is a monotonically increasing multi-part sequence number. The sequence number can contain two parts, a data loss sequence number and a replication sequence number.

A version chain refers to an ordered list of modifications done to a key. A version chain can include inserted and deleted versions.

A write-set refers to a state element containing uncommitted set of writes for an in-flight transaction. The write-set can be managed in-memory independently of the index and advantageously independently of the data structure such that new records in the write-set do not change the data structure until committed as described herein in detail.

A commitment or committing refers to a process that includes transferring changes indicated in a write-set (e.g., transaction instances) into a differential state.

A differential state refers to a state element containing the outcomes of concurrently committing transactions.

A consolidated state refers to a state element containing the outcome of previously committed transactions.

A consolidation refers to a process that includes merging the current differential state with an existing consolidated state. The outcome of the consolidation is a new consolidated state.

A checkpoint refers to a process of making an in-memory state durable. An in-memory state that is checkpointed so the in-memory state can survive replica node state changes (e.g., a crash and restart).

A database operation refers to performing one or more transactions that generally represent any change in a database. For example, a write operation can refer to an insert transaction or add transaction, where execution of the write operation includes generating a transaction instance for the insert transaction or add transaction. A database operation can be associated with an in-flight transaction that refers to an active transaction that has not been committed or aborted, where transaction changes for an active transaction are stored in a write-set. It is contemplated that a transaction can include one or more independent units of work, each reading and/or writing information to a database or other data store. It is further contemplated that a transaction (e.g., add transaction or insert transaction) can have one or more transaction changes (or transaction units) referred to as transaction instances, where if one transaction instance fails, the entire add transaction or insert transaction can be rolled back. For example, consider a bank database that contains balances for various customer accounts. Suppose that we want to record a payment of $100.00 from Alice's account to Bob's account. This would include several transaction changes (transaction instances) that are performed. As such, a write operation (add transaction or insert transaction) is executed only when all transaction changes (transaction instances) are committed or none are committed. This ensures that the database is not left in an unstable state.

The replicable differential store platform refers to integrated components using and implementing the index and protocols that facilitate the optimized database transactions. The integrated components refer to the hardware architecture and software framework that support optimized database transaction functionality using the replicable different store platform. The hardware architecture refers to generic physical components and interrelationships thereof and the software framework refers to software providing functionality that can be implemented with hardware operated on a device. Specifically, the hardware architecture may be generic to simplify the functionality described herein using the software framework of the allocation platform. The end-to-end software-based replicable differential store platform can operate with the system components to operate computer hardware to provide optimized database transaction functionality.

By way of example, the replicable differential store platform can include API library that includes specifications for routines, data structures, object classes, and variables may support the interaction the hardware architecture of the device and the software framework of the system. These APIs include configuration specifications for the platform such that client devices, replicable differential store devices, and replica nodes can communicate in the cloud computing platform. For example, a client request interface may be integrated in the replicable differential store platform to support communicating information via an interface at the client device.

Embodiments described herein can support functionality using the replicable differential store system ("system") that implements an index and a protocol. The replicable differential store system can be implemented on a cloud computing platform that includes a plurality of primary replica nodes and secondary replica nodes. The primary replica nodes are configured to receive a plurality of operation requests (e.g., read operations and write operations) simultaneously from a plurality of client devices. At a high level, requests for operations can be received at a replicable differential store operations component ("operations component") in the system. The operations component 114 can access the index and the protocols of the system to execute transactions associated with the requested operations. Operations can include a write operation (e.g., insert/add transactions), a commit operation, an update operation, a remove operation, a read operation (e.g., get/read transactions), a snapshot operation, a read committed from snapshot operation, a read committed operation, a read repeatable operation, a consolidation operation, and checkpoint operation. Operations can further include a backup operation. Backups can be utilized for disaster recovery scenarios. The operations can be performed on replica nodes. In particular, the system includes a primary replica node and a secondary replica node that support high availability. For example, a backup can be restored in the same replica set in the same cluster, in a different replica set in the same cluster, or in a different cluster By way of example, the system can receive a plurality of write operations from the client devices to access different portions of the data structure index. Advantageously, embodiments described herein support optimized processing of the operations based on the replicable differential store platform that manages the plurality of requests in an efficient manner. For example, the differential store platform can implement an append-only write-set that temporarily records transactions which upon committing the transactions can be persisted in a differential state and consolidated state. The system can support append-only updates that are different from in-place updating, wherein the append-only updates support write consistency. The system can also support streaming checkpoints for recovery, where there are no random writes. The system also supports asynchronous checkpoints and consolidations without the write path (add, remove, update) or read (get, enumerate) being affected. The system further supports non-blocking checkpoints and consolidation with read/write availability during operations. In addition, the system is designed for multi-core architectures where threads are not blocked from transaction initiation to transaction commitment. The system supports transactions and multiple read isolation levels for the data structure and asynchronous logical level locking. The system also supports high availability through replication and recovery features and cancellation support for operations. The system implements integrated support for historical data and supports data change notifications on commit/abort transactions.

By way of example, a historical mode can be implemented, where nothing is lost and everything is maintained forever. This mode can support "as of" historical queries. MultiVersion model mode, which is atypical MVCC (multiversion concurrency control) model, this mode supports snapshot enumerations. SingleVersion mode, where only the last version is maintained. This mode can support read committed form snapshot. The modes are a trade-off between memory and locking required during reads. The system can further support garbage collection that can be implemented lazily on the write-set. Other variations and combination of database transaction optimization features based on the system are contemplated with embodiments described herein.

Accordingly, in a first embodiment described herein, a system for optimizing data transactions based on replicable differential store data structures is provided. The system includes an operations component of a replicable differential store data structure configured for: executing a write operation, wherein executing the write operation comprises: identifying a key and a key range partitioner in a write operation request, wherein the key range partitioner indicates a key range for partitioning an internal state of an index of the replicable differential store data structure into a plurality of sub-indexes; generating a redo instance, wherein the redo instance comprises redo information comprising instructions for performing an operation on a replica node to redo the write operation; generating an undo instance, wherein the undo instance comprises undo information comprising instructions for performing an operation on a replica node to undo the write operation; acquiring an intent write lock on a differential state of the replicable differential store data structure, wherein the differential state comprises a result set of currently committing transactions; acquiring a write lock on the key; determining that the key has not been previously added to the index based on performing an extant inquiry operation, wherein the extant inquiry operation makes a determination whether the key has been previously added to the index; communicating a replica operation instance comprising the redo instance and the undo instance such that the write operation is replicated to a replica node; generating a transaction instance in a write-set, the transaction instance comprising a modification to the key, wherein the write-set comprises an uncommitted set of writes for an in-flight transaction; and determining whether the write operation is aborted or committed, wherein when the write operation is aborted the replica operation instance and the transaction instance are discarded, and wherein when the write operation is committed a result set of the transaction instance is persisted in the differential state.

In a second embodiment described herein, a computer-implemented method for optimizing data transactions based on replicable differential data stores is provided. The method includes accessing an operation request, the operation request having a key for the operation on a replicable differential store data structure. The method further includes acquiring a lock on a differential state of the replicable differential store data structure. The differential state comprises a result set of currently committing transactions. The method further comprises acquiring a lock on the key. The method also includes generating a transaction instance, of the operation, for a write-set, the transaction instance comprising a modification to the key, wherein the write-set comprises an uncommitted set of actions for an in-flight transaction; and determining whether the operation is aborted or committed, wherein when the operation is aborted the transaction instance is discarded, and wherein when the operation is committed, a result set of the transaction instance is persisted.

In a third embodiment described herein, a computer-implemented method for optimizing database transactions in a replicable differential data store data structure is provided. The method includes determining an isolation level for a read operation, the read operation comprising a key. The method also includes applying a plurality of isolation visibility rules for executing the read operation. The isolation visibility rules correspond to the isolation level for the read operation. The method further includes retrieving a value for the key in the read operation based on referencing at least one of a write-set, a differential state, and a consolidate state. The write-set comprises an uncommitted set of writes for an in-flight transaction. The differential state comprises a result set of currently committing transactions. The consolidated state comprises a result set of previously committed transactions. The method includes communicating the value for the key.

Figure 1B:
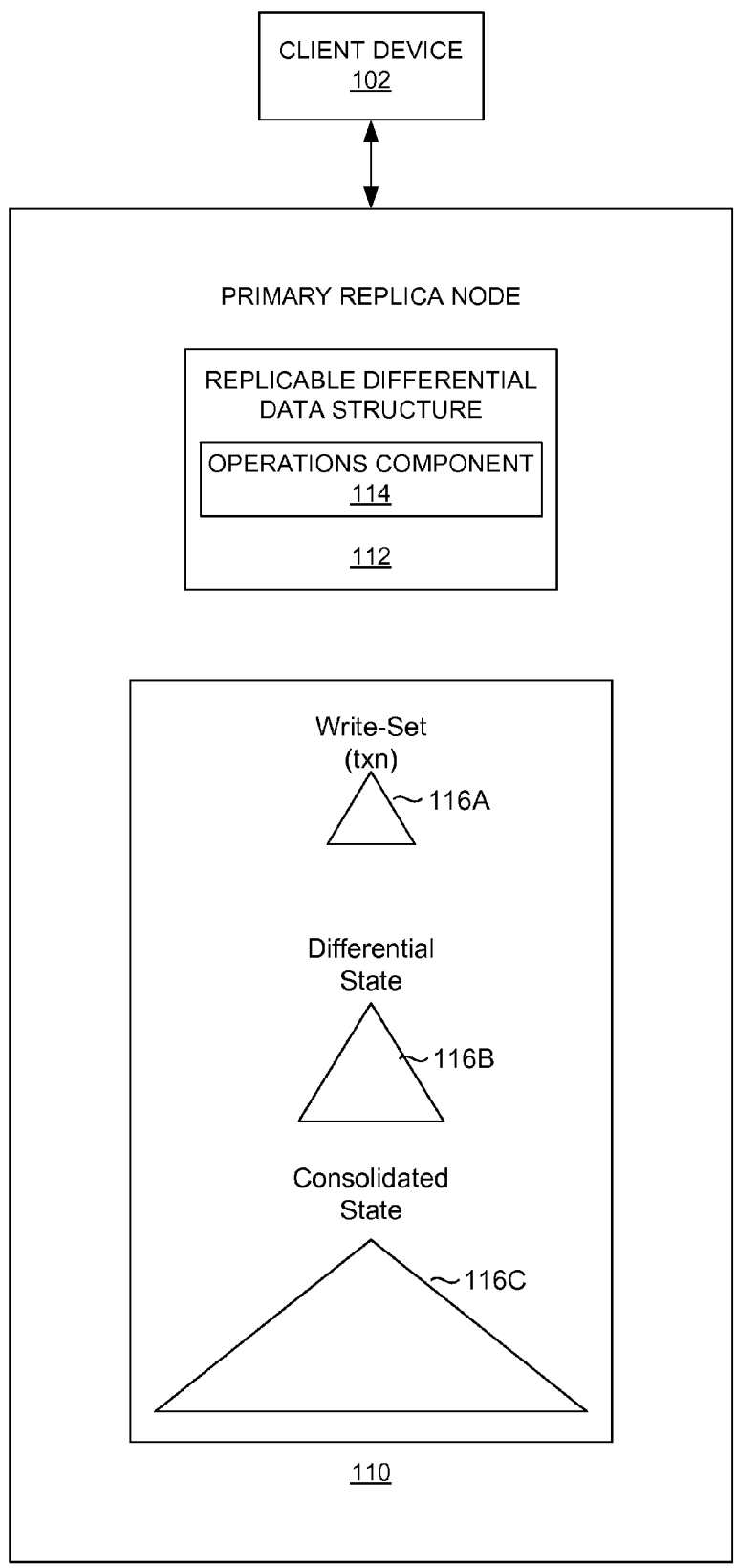

Turning to FIGS. 1A and 1B, FIG. 1A illustrates components in a replicable differential store system that facilitates performing functionality described herein. Among other components not shown, the system includes client device 102, primary replica node 110 having a replicable differential data structure 112 that includes an operations component 114, storage component 116, and further includes a secondary replica node 120 having a replicable differential data structure 120 that includes an operations component 124, storage component 126, and a replicator component 130 having a log 132. Advantageously the replicable differential storage store can be implemented in a cloud computing platform having a plurality of primary replica nodes that correspond to one or more secondary replica nodes for each of the plurality of secondary replica nodes. A replica node can receive a plurality of operations requests and process them simultaneously and asynchronously as described herein. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 1B, the client device 102 can be configured to receive, generate and communicate requests to perform operations on the data structure. The client device 102 can facilitate generating different types of operations and communicate the operations to a node to perform the operation against the data structure. For example, the client component can communicate a write operation having an insert transaction that is performed on the data structure using the index and the protocol of the data structure. The client device can communicate with the primary replica node or the secondary replica node to communicate operation requests. It is contemplated that the primary replica node and the secondary replica node may execute operations differently based on their roles as primary and secondary. For example, a read operation request from client 102 can be executed differently when communicated to a primary replica node than a secondary replica node.

The primary replica node 110 and the secondary replica node 120 can be configured to execute operations using the data structure. In particular, local operations can be performed on the primary replica node 110 and replicated to one or more secondary nodes. The primary replica node 110 can receive a request to perform an operation and perform the operation to execute a transaction based on a primary node operation framework. It is contemplated that the secondary node can receive a replica operation instance such that the transaction is executed on the secondary replica node 120 using a secondary node operation scheme. Commonly, the second node operation scheme can be used to replicate a result set of the primary node operation. The secondary replica node 120 can also perform other transactions that are not limited to replicating results of the primary node operation. It is contemplated that a primary replica node operation scheme of a selected operation can be different from a secondary replica node operation scheme for the same operations. In this regard, the primary replica node 110 and the secondary replica node 120 can both implement an operations component (e.g., operations component 114 and operations component 124), however the corresponding operation components can perform differently on each node.

With continued reference to FIGS. 1A and 1B, the storage component(s) 116 are responsible for storing a write-set and one or more states of the data structures. The storage components can specifically store write-set 116A, differential state 116B, and consolidated state 116C associated with operations, transactions, and corresponding results performed on the data structure. One or more of the storage components can be implemented memory devices and in particular as an in-memory components. One or more of the storage components can further be implemented as a solid-state drive data storage device that use integrated circuit assemblies as memory to store data persistently. The write-set can be a collection of records of transaction instances, advantageously in-memory, that can be managed independently of the data structure or specifically the index, such that, the transaction instances are not persisted in the data structure prior to committing the transaction instances to the differential state 116B also, advantageously, in-memory.

The primary replica node 110 and secondary replica node 120 can each implement a replicable differential store data structure. The replicable data structure includes an index and set of procedures—protocols that are supported to provide the functionality described herein. An operations component in the corresponding primary replica node 110 and the secondary replica node 120 performs operations that optimize database transactions.

The operations component 114 is responsible for performing write operations. A write operation can include an insert transaction or an add transaction, in this regard, the same steps are executed when performing a write operation either as an insert or add transaction. The operations component 114 can receive a write operation request (e.g., insert transaction) for a selected key. In one embodiment the key can be serialized into a byte array format. Serialization generally refers to translating an object state into a format that can be stored and reconstructed later in another computing environment. As such, the key is serialized into byte format so it can be stored and deserialized on a secondary node. The byte format can also be used for locking, as discussed in more detail herein. Embodiments described herein can support multiple key types. Each key type can be associated with an appropriate byte converter type for serializing and deserializing the key type.

The operations component 114 can identify the differential state 116B for the key. The differential state 116B comprises the state of current-committing-transactions. The system supports processing a key range partitioner. The key range partitioner can be received with write operation request having the insert transaction. The key range partitioner instructs the operations component 114 to partition the internal state of the index into multiple sub-indexes. The multiple sub-indexes can support reduced contention and parallel scanning and consolidation of portions of the index. The differential state and a consolidated state that comprises previously-committed-transactions can be internally partitioned according to the range partitioner.

The operations component 114 can compute a replica operation instance. A replica operation instance can refer to information about an operation that allows the operation to be performed on a replica node. For example, a replica operation instance can be a redo instance and an undo instance. The redo instance comprises information that can be accessed and use during a recovery process. The redo instance can also be performed on the secondary replica node 120 to redo the write operation. The undo instance comprises information that is used during a recovery process to undo the write operation during false progress processing.

The operation component 114 can also acquire an intent write lock on the differential state that holds the key. The intent write lock acquired by the write component prevents clear operations on the index. The operations component 114 can also acquire a write lock on the key. The write lock on the key acquired by the operations component 114 prevents other writes (e.g., a parallel insert transaction) from performing modifications on the key. Write operations can use pessimistic locking which locks the key for a lock period that runs from the time the key is first accessed until when the transaction is finished, making the key inaccessible to other transactions during the lock period.

The operations component 114 can make a determination whether a key can be added the index. The determination whether a key can be added to the index can be called an extant inquiry operations; basically an inquiry to see whether the key exists in the index. The determination is performed because if another write operation had completed an insert transaction of the same key before the operation component 114 could acquire the lock, the key cannot be added. If has already been added, then an error message is communicated. It is contemplated that the extant inquiry operation can be a comprehensive inquiry operation where the operation iteratively checks one or more of the write-set, the differential state, and finally the consolidation state before making the determination that the key has not been previously added to the write-set or the index.

When the operations component 114 determines that a key can be added, the operations component 114 can communicate a replica operation instance of the write operation. The replica operation instance can include at least one of the redo instance and the undo instance. The replica operation instance can include an identifier of the replicable index on the primary replica node. It is contemplated that the primary replica node 110 and secondary replica node 120 can include multiple indexes, as such, the identifier can facilitate identifying a particular replicable index.

The operations component 114 can create a transaction instance for a transaction. The transaction instance can specifically include a modification to the key of the write operation. The transaction instance is generated as a record in the write-set as one of a plurality of uncommitted set of writes for the active transaction (e.g., in-flight transaction). The type of write operation defines the modification of the key. For example, an insert transaction corresponds to an inserted version; an add transaction corresponds to an add version; an update transaction corresponds to a version chain comprising a delete version and an inserted version; and a remove transaction corresponds to deleted version. In this regard, the operations component 114 creates a new inserted version for the key modification. The modification is maintained in the transaction write-set. The operations component 114 can return a success message. The locks acquired by the operations component 114 are long-duration locks such that the locks are released when the transaction aborts or commits.

It is important to note that the state of the key may not actually changed when write-set transaction instance is generated. The in-memory data structures or persisted state of the index have not been modified. After executing the transaction units of the write operation, the operations component 114 performing the write operation completes the insert transaction where the insert transaction can be aborted or committed. If the transaction is aborted, then nothing happens with the operation. The above write operation information including the replica operation instance and the write-set are abandoned as though it they did not exist. It is contemplated that a cancellation request of an operation, a roll back of an operation, or any variations or combinations thereof can lead to no modification performed on the index but rather the write-set is updated accordingly. However, if the transaction commits, then the outcome of the transaction is stored in an in-memory data structure or a differential state 116B of the index.

Figure 2A:
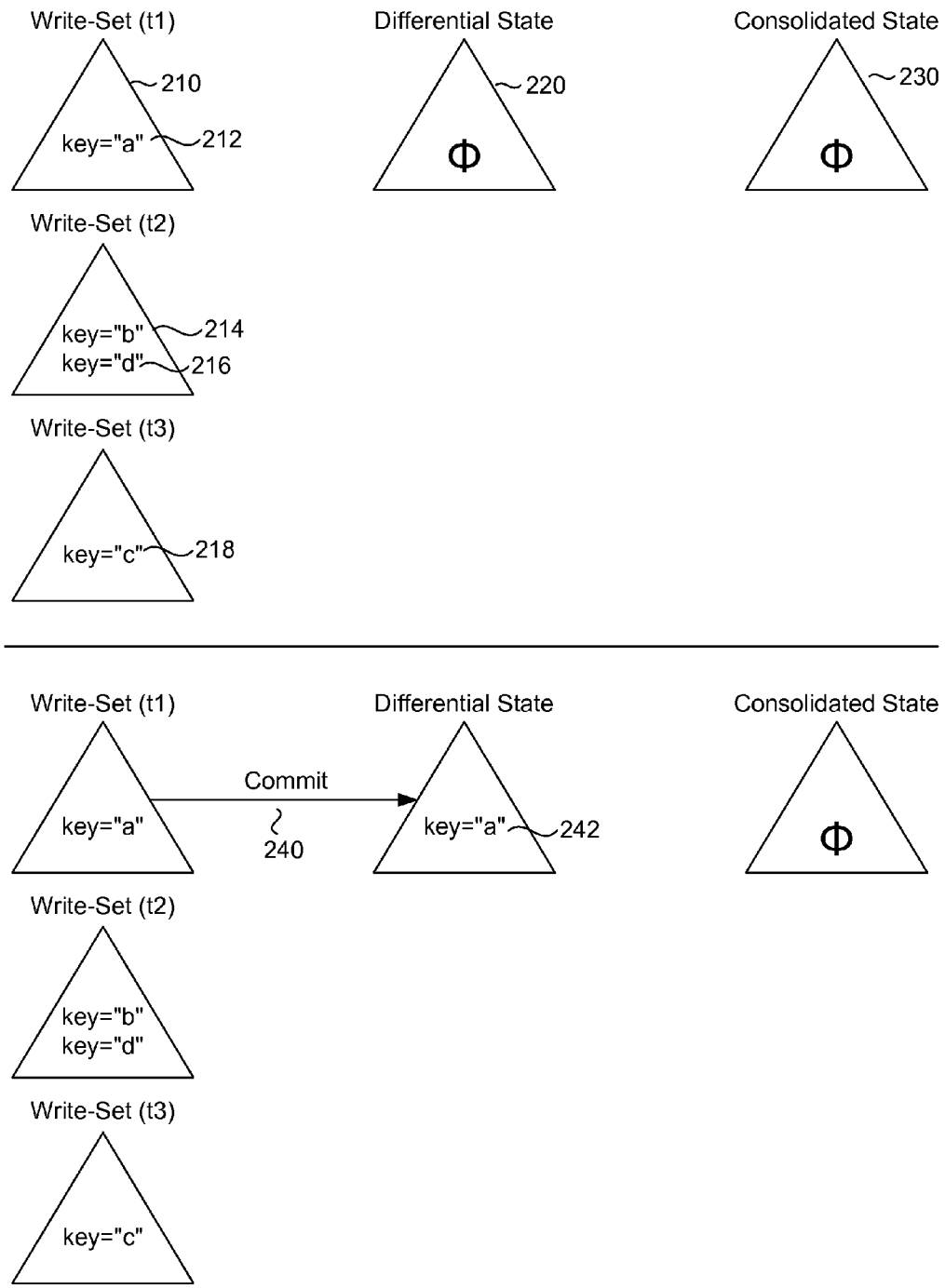
FIGS. 2A-2C are schematics of exemplary operations executed based on a replicable differential store data structure, in accordance with embodiments described herein.
Figure 2B:
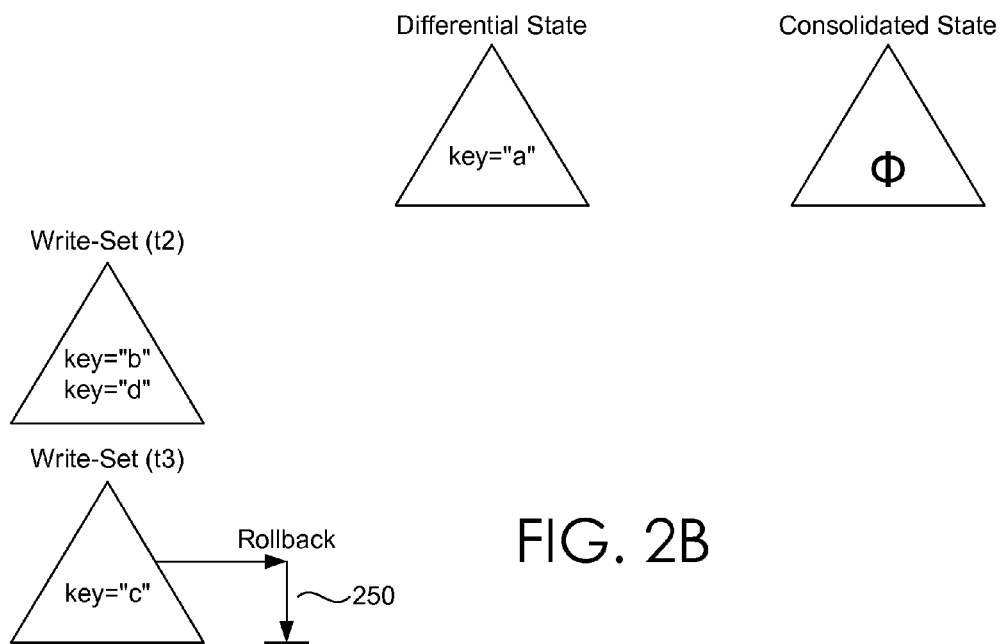
Figure 2C:
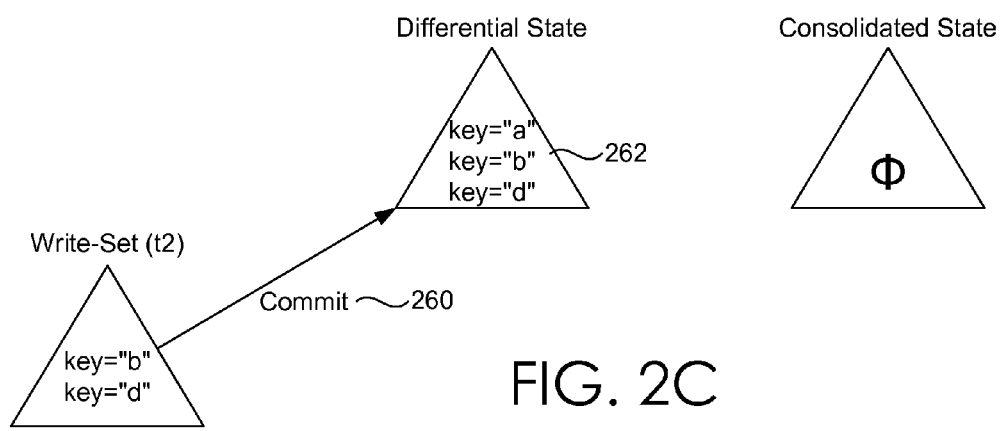

With reference to FIGS. 2A-2C, a visual walkthrough of a write path is illustrated. FIG. 2 includes three write sets—write-set (t1), write-set (t2), 220 and write-set (t3), a differential state 220, and a consolidated state 230. Each of the write-sets have corresponding transaction instances 212, 214, 216, and 218 having keys for an exemplary write operation. The write-set (t1) transaction instance 212—key="a" can be committed 240 to the differential state in accordance with embodiments described herein. In particular, at the end of a write operation, the transaction instance 212 can be committed to persist the result of the transaction 212 in the differential store 220. The differential state now includes key="a" as a differential store instance 242.

With reference to FIG. 2B, the write-set (t3) can be rolled back 250 based on a request to cancel a transaction or failure of an operation to commit. As such, in the write-set (t3), the transaction instance 218 can be removed as a record in the write-set (t3) and does not become part of the differential state. In FIG. 2C, the write set (t2) can be committed 260 to the differential state 220. As such, the differential state includes a differential state instance 262 having keys "a", "b", and "c".

With reference to FIGS. 1A and 1B, the secondary replica node 120 can also implement an operations component 126 that can receive the replica operation instance coming from the primary replica node 110. The replica operation instance can include one or more instances. By way of example, the replica operation instance can include the redo instance. The redo instance can be deserialized in order to reconstruct a transaction of the write operation (e.g., insert transaction). The transaction is applied without taking a lock on the key. Performing an insert transaction without taking a lock on the key is allowed because the secondary replica node 120 does not only snapshot reads and the replicator component ensures group commit barriers as observed on the primary node. The cost of performing operations on the secondary replica node can be lower and more efficient.

The operations component 114 can further perform a commit operation for a transaction commit. Changes maintained in the transaction write-set are moved into the in-memory data structures. The changes maintained in the write-set can specifically be moved to the differential state as discussed with reference to FIGS. 2A-2C. The changes in the transaction write-set can represent index modifications done by that transaction—insert, update, remove. Locks can be released and the write-set is emptied. Notifications can then be communicated to subscribers containing the data changes that occurred in the transaction per key in-order.

The operations component 114 can further perform an update operation for a transaction update. An update operation can be performed by the operations component 114 based on a received update operation request. The update operation is for a key in the primary replica node index 110. The operations component 114 performs similar steps from the write operation during an update operation, except that the transaction instance record, in the write-set, for the update operation is represented as a "deleted" version followed by an "inserted" version. Also a replica operation instance for an update operation contains a redo instance of the update operation (new value for the key) and the undo instance contains the undo information for the update operation (old value for the key). Conditional updates are supported: based on version checks (for optimistic concurrency control) or based on existent value checks.

The operations component 114 can further perform a remove operation for a remove transaction. A remove operation can be performed by the operations component based on received remove operation request. The remove operation is for a key in the primary replica node index. The operations component performs similar steps from the write operation during a remove operation, except that the transaction instance record in the write-set, for the remove operation, is represented as a "deleted" version. Also the replication instance contains the redo instance of the remove (which is to remove the key) and the undo instance contains the undo for this remove (old value for the key). Conditional removes are supported: based on version checks or value checks. Other combinations and variations of write operations (e.g., AddorUpdate, UpdateWithOutput, RemoveWithOutput, TryRemove, TryAdd, TryUpdate, etc.) are contemplated with embodiments described herein.

The operations component 114 is responsible for performing read operations. A read operation can include Get/Read, snapshots, read committed from snapshot, read committed, and read repeatable transactions. In this regard, the similar steps can be executed when performing a read operation. A read operation can include a seek or be part of a scan, and in either instance, a read operation functions based on an isolation level to be specified on the transaction such that the read operation is instructed on how to perform read. It is contemplated that secondary replica nodes can perform reads. In particular, the secondary replica node 124 may only allow snapshot reads because locks are not taken when applying write operations. It contemplated that read committed and repeatable read reads on the secondary can be implemented, as well, when locks are acquired during a secondary apply.

Figure 3A:
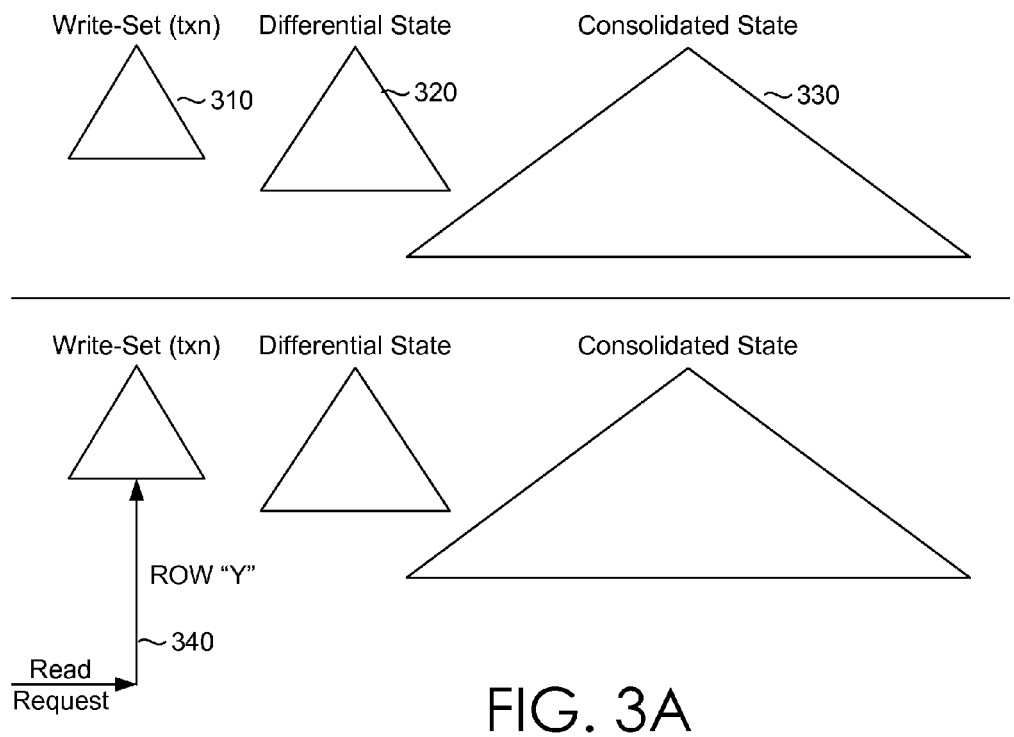
FIGS. 3A-3D are schematics of exemplary operations executed based on a replicable differential store data structure, in accordance with embodiments described herein.
Figure 3B:
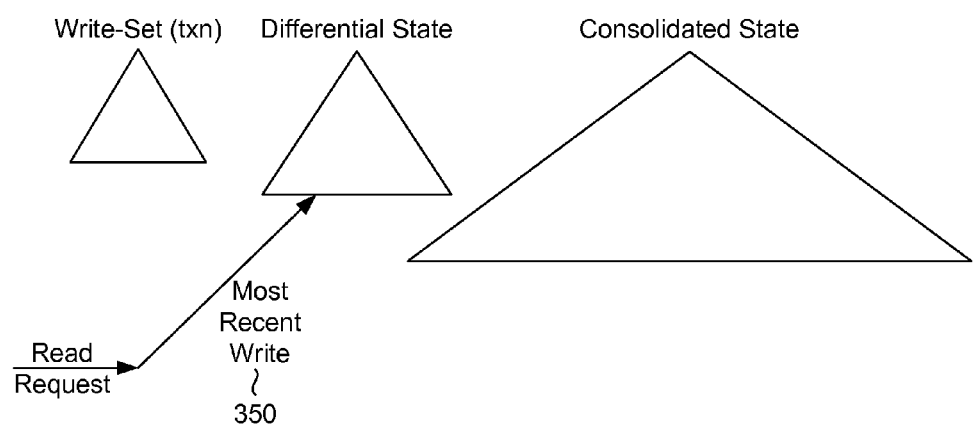
Figure 3C:
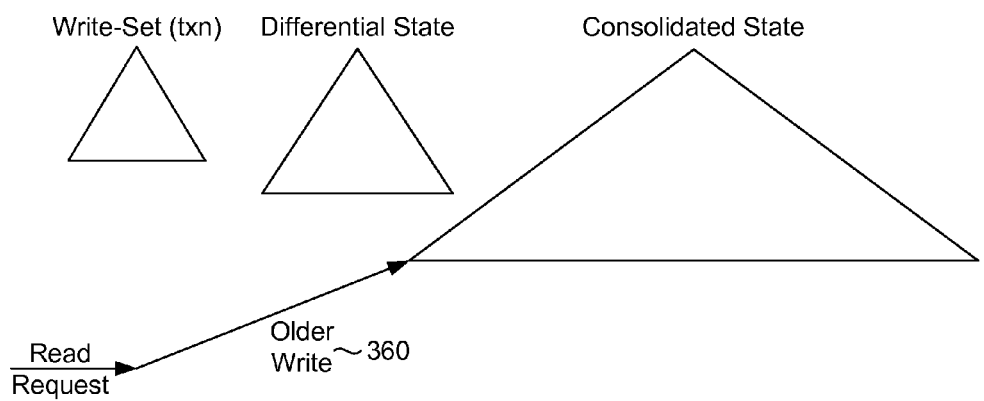
Figure 3D:
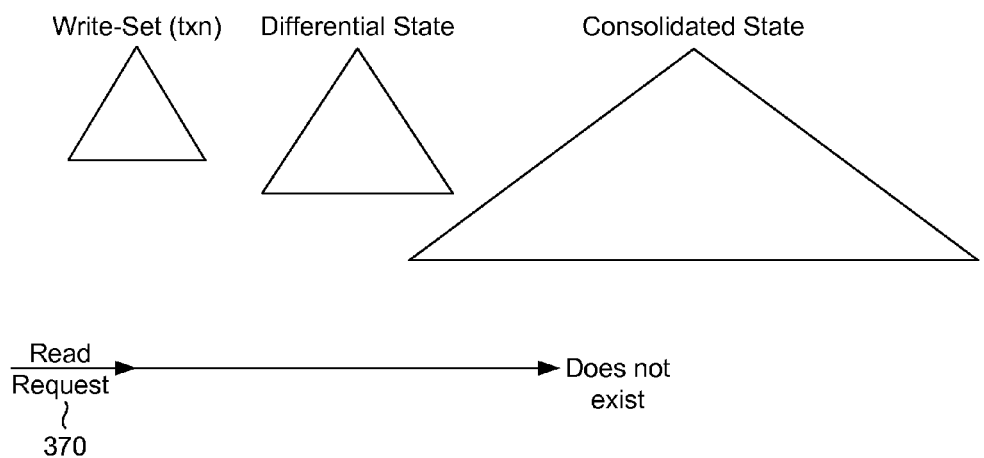

In operation, with reference to FIGS. 3A-3CD, a visual walkthrough of a read path is illustrated. FIG. 3A includes a write-set (txn)—310, differential state—320, and consolidated state—330. A read operation request—340 can be received and an isolation level for a read operation is determined. The read operation includes a key (e.g., ROW "Y"). An isolation visibility rule for executing the read operation is applied, the isolation visibility rule corresponds to the isolation level for the read operation. The operations component 124 will try to perform read operations from the write-set of the transaction, when possible, as information about the latest key changes are stored there. Basically, in retrieving a value for the key in the read operation at least one of a write-set, a differential state, and a consolidated state is referenced, wherein the write-set comprises an uncommitted set of writes for an in-flight transaction, wherein the differential state comprises a result set of currently committing transactions, and a consolidate state, where the consolidated state comprises a result set of previously committed transactions. If the read request 350 is for the most recent writes, the operations component 114 can reference the differential state 320. If the read request 360 is for older write, the operations component 114 can reference the consolidated state 330. A read request 370 can resolve to a record does not exist when the write-set 310, the differential state 320, and the consolidated state 330 have all been referenced without identifying the key.

The operations component 114 can perform snapshot read operations. The read operation can be executed by following the snapshot isolation visibility rules. That means that the value returned for the key specified in the read operation is the value of that key as it was known and committed before the transaction that is executing a current read operation started. If the key did not exist before this read operation started, no value is returned. Snapshot reads are stable, in the sense that for the same key in the same snapshot read transaction one would read the same value over and over again. No key locks are being taken as part of this read.

The operations component 114 can perform read committed from snapshot operations. Snapshot visibility rules can be applied again, but this time the snapshot visibility rules are with regard to when this read operation started in this transaction, and not when the transaction started. This read operation basically returns the most recently committed value for the given key before this read operation started, without acquiring any key locks.

The operations component 114 can also perform read committed operations. The read committed operations involve the key being read by first acquiring a short duration lock on that key. This basically ensures that while that key is being read no writer is modifying it. The operations components can also perform read repeatable operations. The read repeatable operations involve the key being read by acquiring a long duration lock on that key (release only at transaction commit or abort). Repeatable reads are stable, but phantoms can appear (repeated scans may contain only superset of what was read before).

Figure 4A:
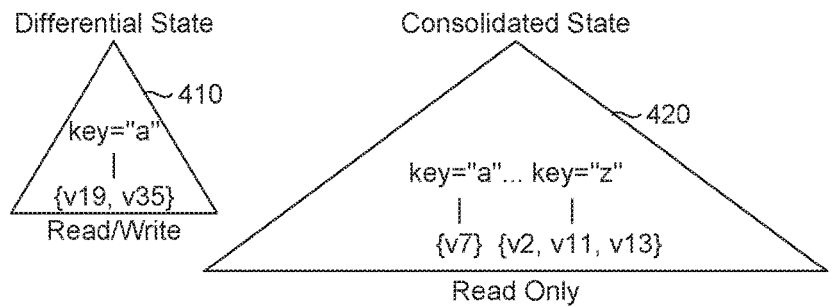
FIGS. 4A-4F are schematics of exemplary operations executed based on a replicable differential store data structure, in accordance with embodiments described herein.
Figure 4B:
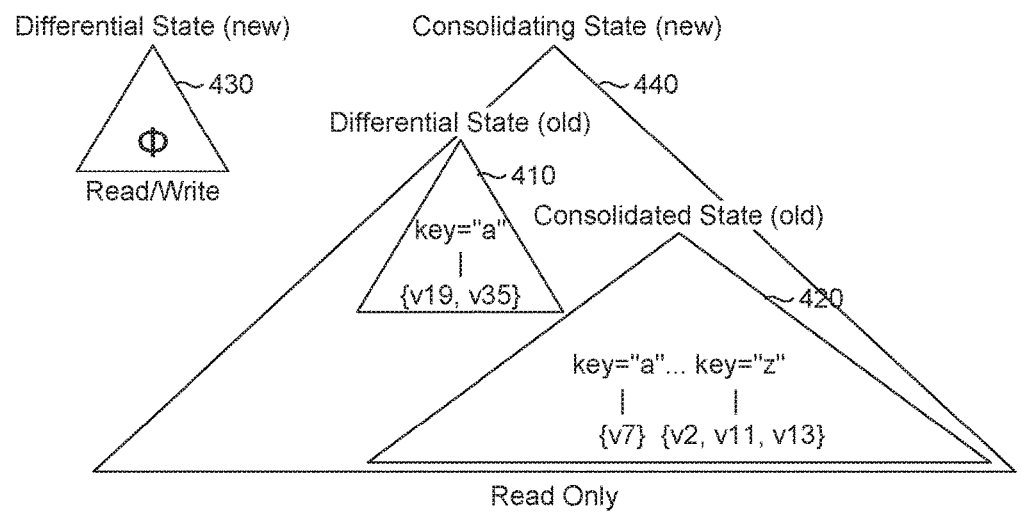
Figure 4C:
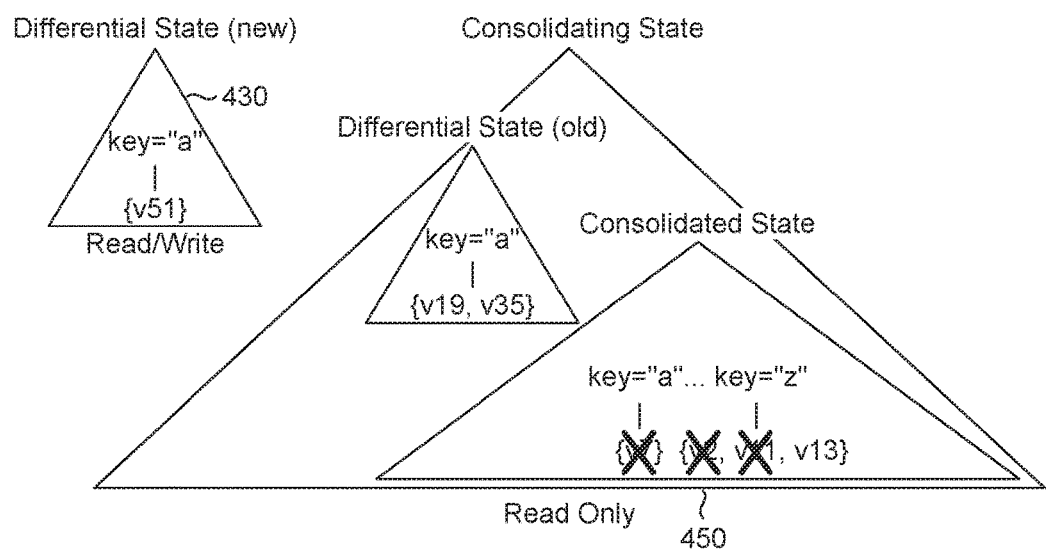
Figure 4D:
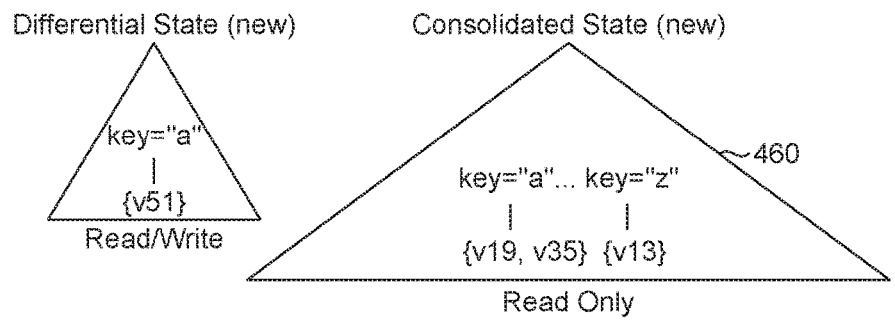

The operations component 114 is responsible for performing consolidation operations. With reference to FIGS. 4A-4F a consolidation operation based on a replicable differential store data structure is illustrated. A consolidation operation is responsible for a process that includes merging the current differential state with an existing consolidated state. The outcome of the consolidation is a new consolidated state. As part of the consolidation, old versions of a key modification are removed when there are no active readers for those versions. Consolidations prevents the replicable index from growing infinitely. Turning to FIG. 4A a differential state having a differential state instance—key "a" {v19, v35} and a consolidate state having a plurality differential state instances key="a" {v7} . . . key="z" {v2, v11, v13}. The differential state can be a read/write state and the consolidated state can be a read only state. FIG. 4B illustrates a new differential state 430 with no instance and a new consolidating state 440 of old differential state 410 and old consolidate state 420. In FIG. 4C, the new differential state 430 includes a new differential instance with key="a" {v51}. The new consolidating state 440 removes old versions 450 of key modifications. FIG. 4D illustrates the new consolidated state 460. The consolidation operation can also be performed during a copy operation. The consolidation operation and the copy operation can be performed concurrently to minimize the amount of data being copied to build a new replica.

Figure 4E:
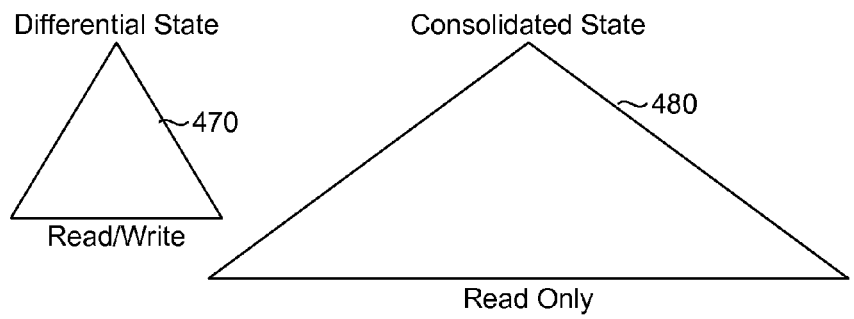
Figure 4F:
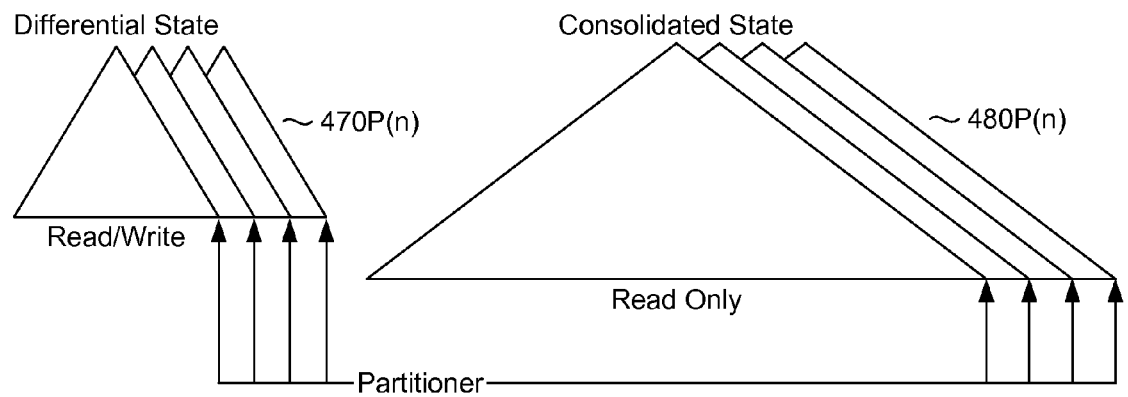

The consolidation operation can be performed in parallel for each range that describes the partitioning of the internal differential and consolidated states. With reference to FIGS. 4E and 4F, differential state 470 and consolidated state 480 are indicated where differential state 470P(n) and consolidated state 480P(n) can include "n" internal sub-indexes of parallel ranges that facilitate processing operations, consolidating in particular, asynchronously, lazily and flexibly in accordance with embodiments of the present inventions. It is contemplated that the operations component 114 can perform a consolidation in combination with a checkpoint operation. Combining the consolidation operation and the checkpoint operation can minimize the amount of data that is persisted for recovery.

The consolidation operation can determine whether any readers are in progress. Such a determination can be specifically made during a multiversion mode, since if there exist readers in progress over older versions, a trim operation cannot be performed. For single version mode, a trim can be performed, since readers always read most recently committed versions. The determination can help define how much history the consolidation operation needs to keep for the new consolidated state, and then trims everything else. However, during a historical mode, where all changes are kept around forever, the historical information is not discarded. The differential state is a read/write state and the consolidated state is a read only. Locks are not acquired when reading the consolidated state. As part of a consolidation operation, a new empty (and to be populated differential state) is constructed for reads and writes, and a new consolidated state is created used for reads only. While performing the consolidation operation, read and write availability can be guaranteed. Consolidation can be performed independently on primary replica nodes and secondary replica nodes. As such, the structure of the index in not maintained in lock step.

Figure 5A:
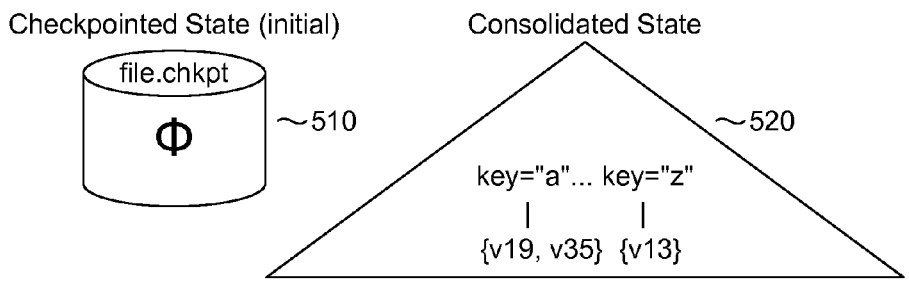
FIGS. 5A-5C are schematics of exemplary operations executed based on a replicable differential store data structure, in accordance with embodiments described herein.
Figure 5B:
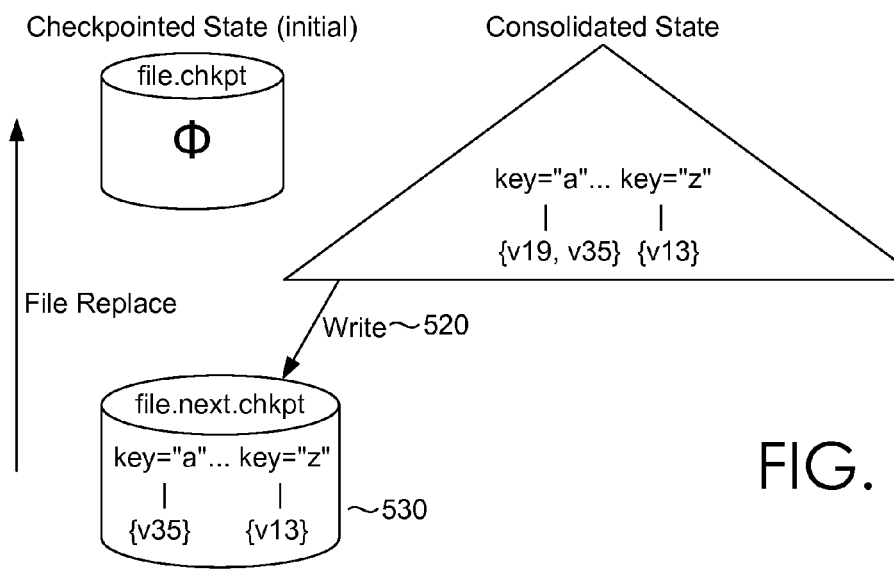
Figure 5C:
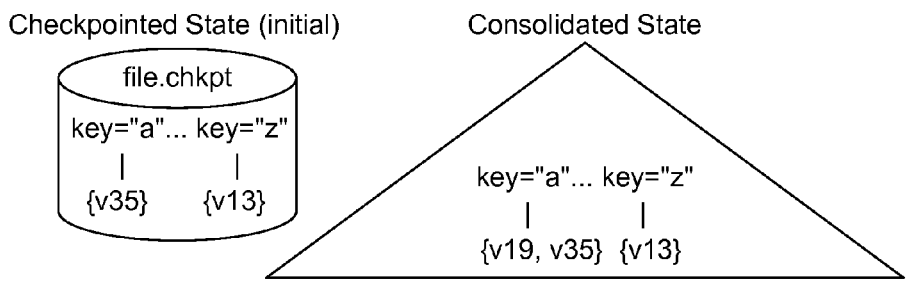

The operations component is responsible for performing checkpoint operations. With reference to FIGS. 5A-5C, a consolidated state (initial) 510 having a checkpoint instance and a consolidated state 520 having a consolidated state instance are illustrated. A checkpoint operation refers to a process of making an in-memory state durable. An in-memory state (e.g., a consolidated) that is checkpointed can survive a crash. A checkpoint policy can be driven by a replicator component (e.g., replicator 130). In operation, the replicator component 130 can define a policy for truncating a log (e.g., log 132) after a predefined period of time. The replicator component 130 can communicate a persist indication to the operations component, where the persist indication includes a request to persist changes. The checkpoint operation can be performed at the operations component that runs independently on replica nodes. It is contemplated that writes to the storage component (e.g., disk or solid state disk) are only performed during a checkpoint operation. Writing to the storage component can be performed asynchronously with the read or write path. Checkpoint operations and copy operation can also run concurrently, such that, a local log of a primary replica node can be truncated while a new replica on a different node is built. It is contemplated that there exists no need for synchronization between a checkpoint operation and a copy operation Multiple copy operations can also run concurrently when more than on node needs to be built. As such, the consolidate can identify changes to changes for key "a" through key "z" and persist the changes in a checkpointed state 530, such that the checkpointed state 530 becomes the new initial checkpointed state as shown in FIG. 5C. As described above a copy operation is executed from memory. A copy operation can also be executed from latest checkpoint, in which case the latest checkpoint file can be read and sent over in order to build a new replica. In this case, the copy operation and checkpoint operation cannot run in parallel, but need to be synchronized. Copy operations can still run in parallel. In practice this functionality is advantageous as building a new replica can be of a better business value than truncating a local log.

The replicator component 130 can be configured to perform several recovery and replication based operations. A version refers to an identifier for a record. Any modification of a key can produce a new record for that key. The new record is uniquely identified by a version that is a monotonically increasing multi-part sequence number. The sequence number can contain two parts, a data loss sequence number and a replication sequence number. The data loss sequence number of replication sequence number preserves the state of a modification to be able to identify different state of the index at different points in the past. As such, when a data loss occurs the data loss sequence number can increase, logically resetting the replication sequence number. Tracking the data structure in this matter can help easily detect data losses and can be useful in performing audits. The replication component 130 is further configured to work with the operations components to receive and communicate replica operation instances and referencing a log component to indicate a checkpoint trigger, in accordance with embodiments described herein.

Figure 6:
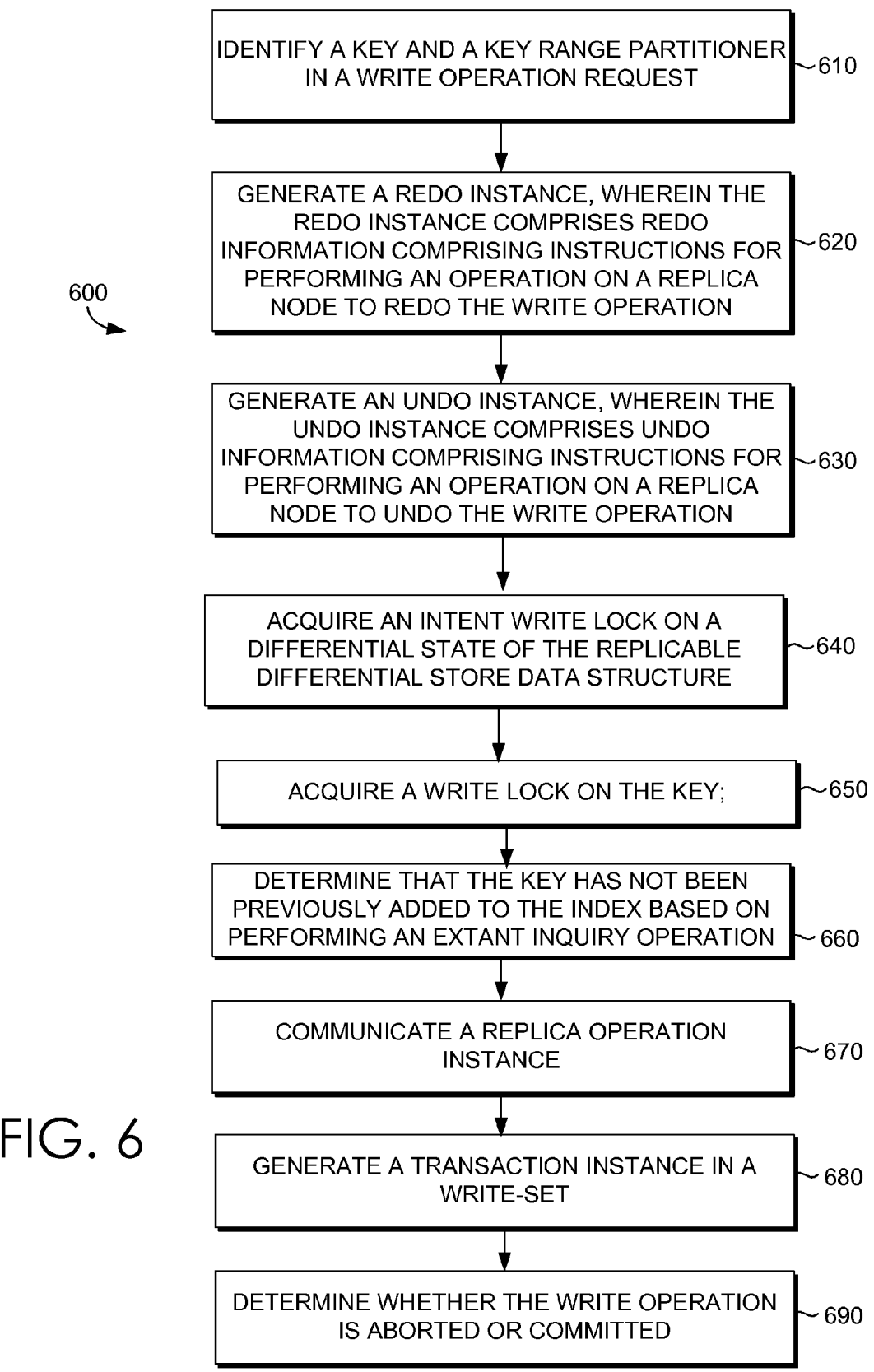
FIG. 6 is a flow diagram showing an exemplary method for optimizing database transactions based on a replicable differential store data structure, in accordance with embodiments described herein.

Turning now to FIG. 6, a flow diagram is provided that illustrates a method 600 for optimizing database transactions based on a replicable differential store data structure. Initially at block 610, a key and a key range partitioner in a write operation request are identified. The key range partitioner indicates a key range for partitioning an internal state of an index of the replicable differential store data structure into a plurality of sub-indexes for identifying the index range to perform the write. At block 620, a redo instance is generated, where the redo instance comprises redo information comprising instructions for performing an operation on a replica node to redo the write operation. At block 630, an undo instance is generated, where the undo instance comprises undo information comprises instructions for performing an operation on a replica node to undo the write operation. At block 640, an intent write lock on a differential state of the replicable differential store data structure is acquired, where the differential state comprises a result set of currently committing transactions. At block 650, a write lock on the key is acquired. At block 660, a determination is made that the key has not been previously added to the index based on performing an extant inquiry operation, where the extant inquiry operation makes a determination whether the key has been previously added to the index. At block 670, a replica operation instance comprising the redo instance and the undo instance is communicated such that write operation is replicated to a replica node. At block 680, a transaction instance is generated in a write-set, the transaction instance comprising a modification to the key, where the write-set comprises an uncommitted set of writes for an in-flight transaction. At block 690, a determining whether the write operation is aborted or committed is made, where when the write operation is aborted the replica write operation instance and the transaction instance are discarded, and when the write operation is committed a result set of the transaction instance is persisted.

Figure 7:
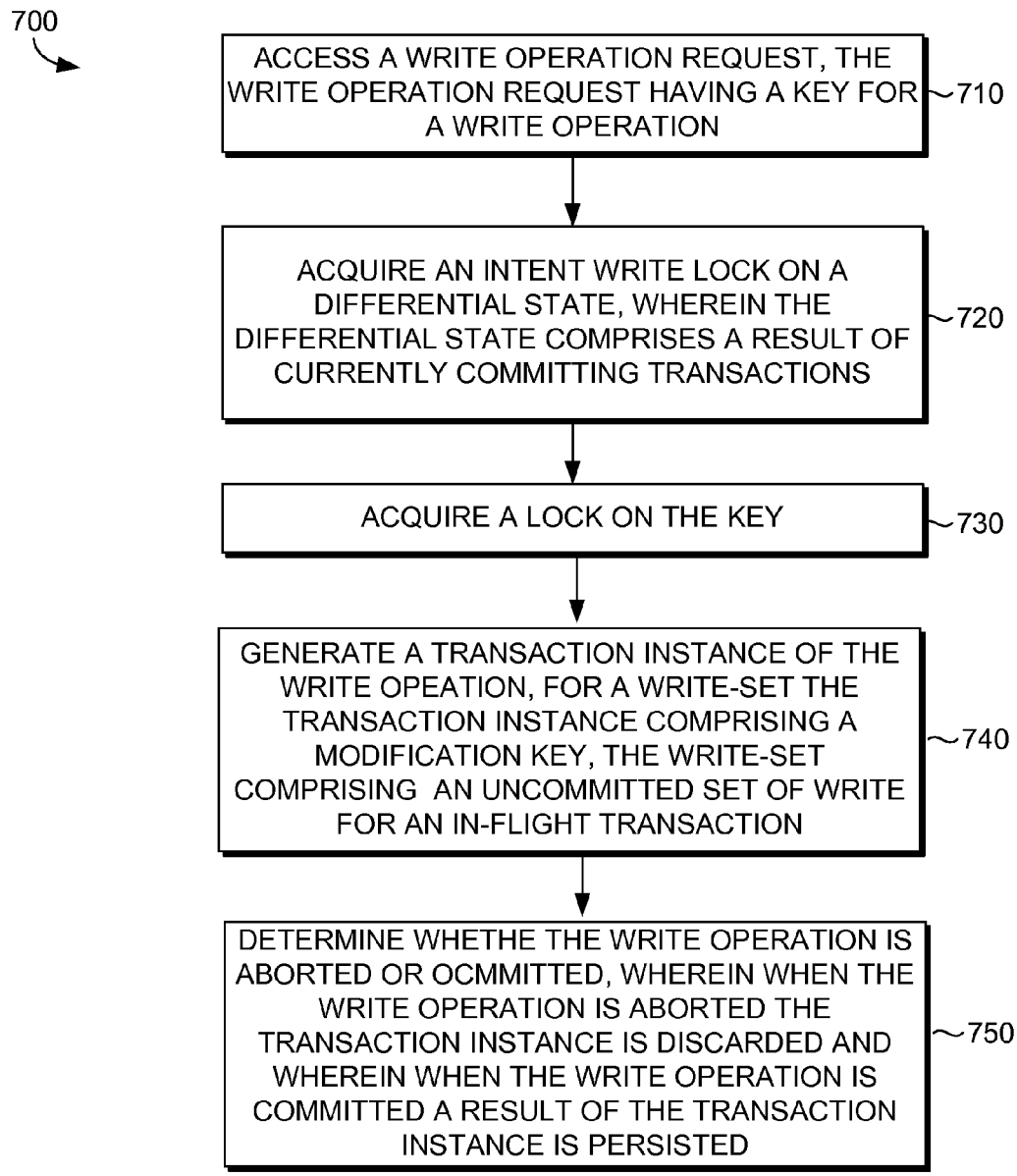
FIG. 7 is a flow diagram showing an exemplary method for optimizing database transactions based on replicable differential store data structure, in accordance with embodiments described herein.

Turning now to FIG. 7, a flow diagram is provided that illustrates a method 700 for optimizing database transactions based replicable differential store data structures. Initially at block 710, a write operation request is accessed, the write operation request having a key for a write operation on a replicable differential store data structure. At block 720, an intent write lock on a differential state of the replicable differential store data structure is acquired, the differential state comprises a result set of currently committing transactions. At block 730, a write lock on the key is acquired. At block 740, a transaction instance, of the write operation, for a write-set, the transaction instance comprising a modification to the key is generated. The write-set comprises an uncommitted set of writes for an in-flight transaction. At block 750, a determination whether the write operation is aborted or committed is made. It is contemplated that when the write operation is aborted the transaction instance is discarded, and when the write operation is committed a result set of the transaction instance is persisted.

Figure 8:
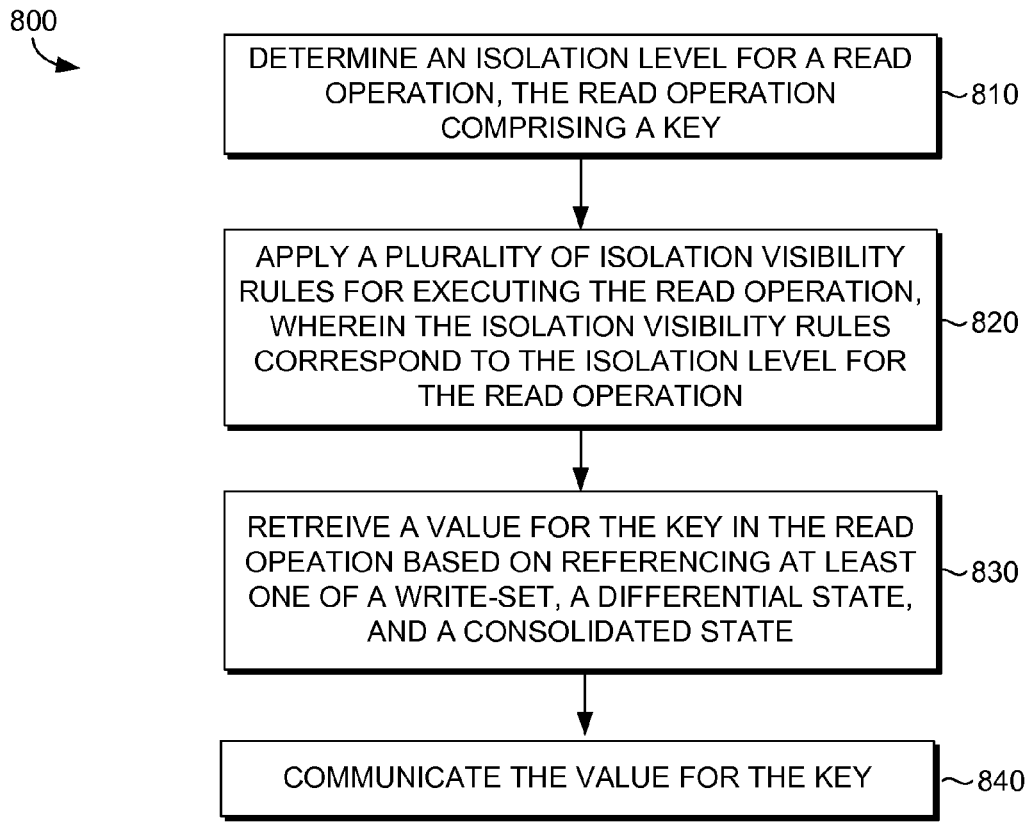
FIG. 8 is a flow diagram showing an exemplary method for optimizing database transactions based on replicable differential store data structure, in accordance with embodiments described herein.

Turning now to FIG. 8, a flow diagram is provided that illustrates a method 800 for optimizing database transactions based replicable differential store data structures. At block 810, an isolation level is determined for a read operation, the read operation comprising a key. At block 820, a plurality of isolation visibility rules are applied for executing the read operation, the isolation visibility rules correspond to the isolation level for the read operation. At block 830, a value for the key in the read operation is retrieved based on referencing at least one of a write-set, a differential state, and a consolidated state. The write-set comprises an uncommitted set of writes for an in-flight transaction, the differential state comprises a result set of currently committing transactions, and a consolidated state, the consolidated state comprises a result set of previously committed transactions. At block 830, the value for the key is communicated.

Figure 9:
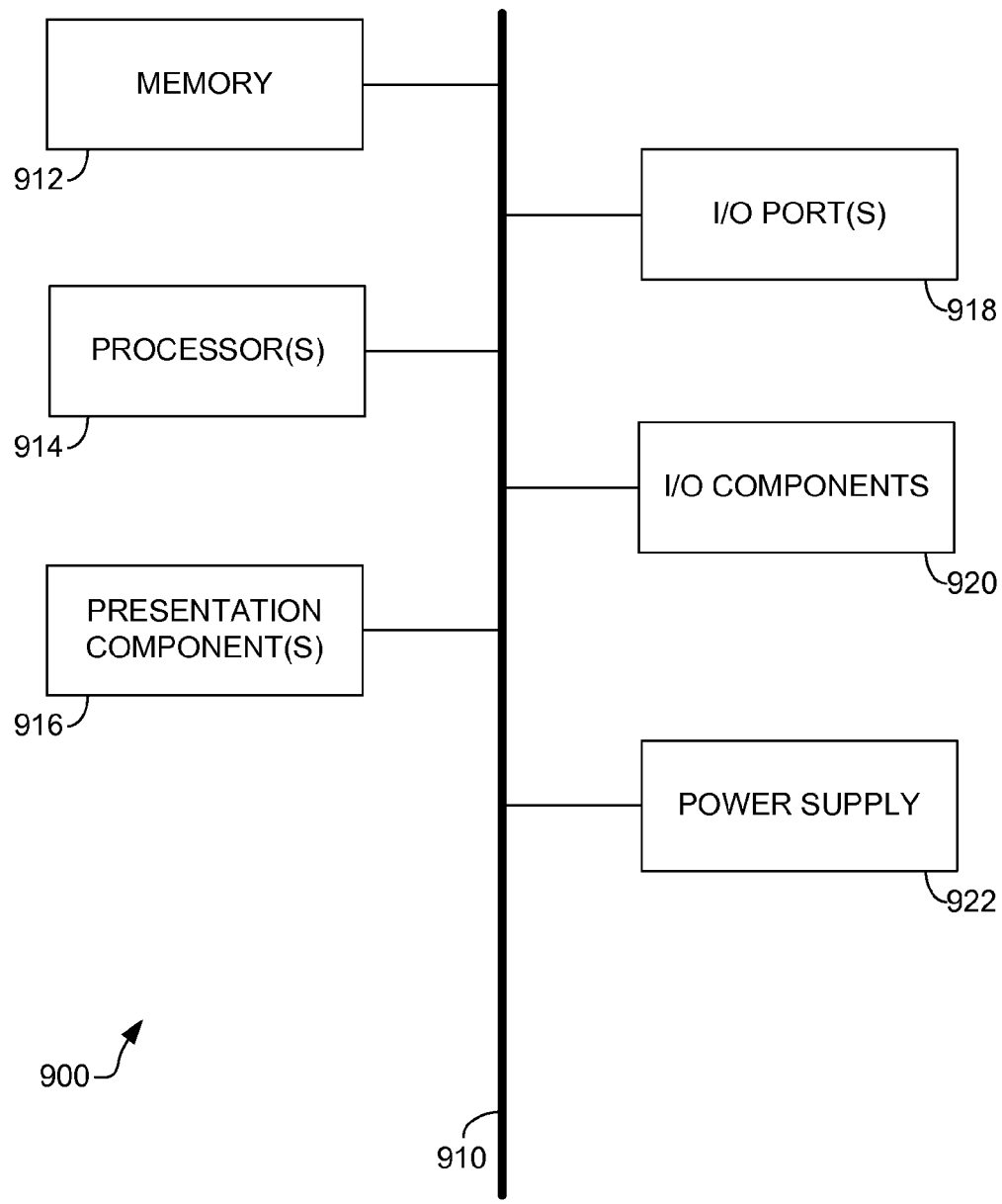
FIG. 9 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Figure 10:
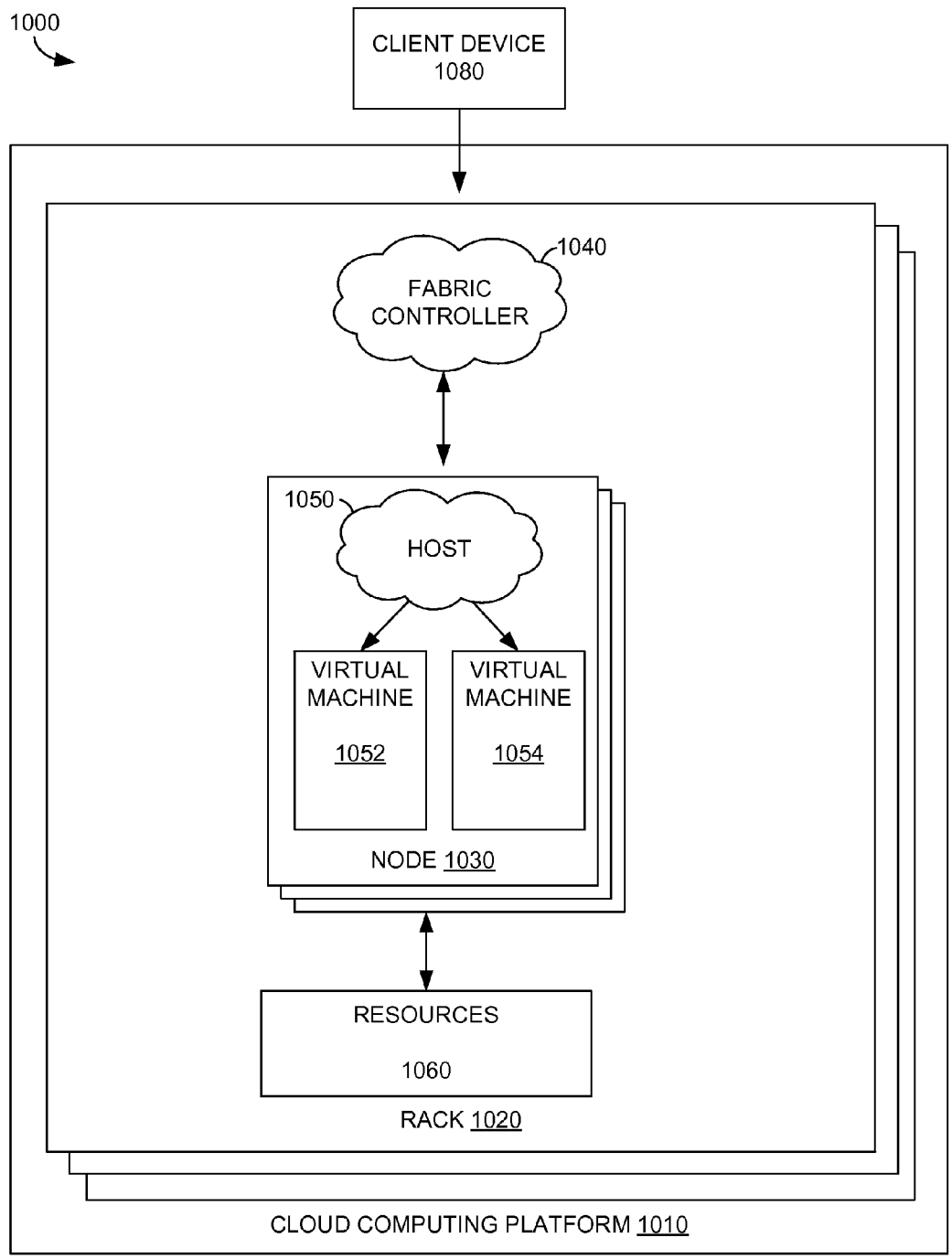
FIG. 10 is a block diagram of an exemplary computing environment suitable for use in implementing embodiments described herein.

Referring now to FIG. 10, FIG. 10 illustrates an exemplary distributed computing environment 100 in which implementations of the present disclosure may be employed. In particular, FIG. 10 shows a high level architecture of the replicable differential store platform system ("system") comprising a cloud computing platform 1010, where the system supports optimizing database transactions. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 1000 that includes the cloud computing platform 1010, rack 1020, and node 1030 (e.g., computing devices, processing units, or blades) in rack 1020. The system can be implemented with a cloud computing platform 1010 that runs cloud services across different data centers and geographic regions. The cloud computing platform 110 can implement a fabric controller 1040 component for provisioning and managing resource allocation, deployment, upgrade, and management of cloud services. Typically, the cloud computing platform 1010 acts to store data or run service applications in a distributed manner. The cloud computing infrastructure 1010 in a data center can be configured to host and support operation of endpoints of a particular service application. The cloud computing infrastructure 1010 may be a public cloud, a private cloud, or a dedicated cloud.

The node 1030 can be provisioned with a host 1050 (e.g., operating system or runtime environment) running a defined software stack on the node 130. Node 1030 can also be configured to perform specialized functionality (e.g., compute nodes or storage nodes) within the cloud computing platform 1010. The node 1030 is allocated to run one or more portions of a service application of a tenant. A tenant can refer to a customer utilizing resources of the cloud computing platform 1010. Service application components of the cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 1030, the nodes may be partitioned into virtual machines (e.g., virtual machine 1052 and virtual machine 1054). Physical machines can also concurrently run separate service applications. The virtual machines or physical machines can be configured as individualized computing environments that are supported by resources 160 (e.g., hardware resources and software resources) in the cloud computing platform 1010. It is contemplated that resources can be configured for specific service applications. Further, each service application may be divided into functional portions such that each functional portion is able to run on a separate virtual machine. In the cloud computing platform 110, multiple servers may be used to run service applications and perform data storage operations in a cluster. In particular, the servers may perform data operations independently but exposed as a single device referred to as a cluster. Each server in the cluster can be implemented as a node.

Client device 180 may be linked to a service application in the cloud computing platform 1010. The client device 1080 may be any type of computing device, which may correspond to computing device 1000 described with reference to FIG. 10, for example. The client device 1080 can be configured to issue commands to cloud computing platform 1010. In embodiments, client device 1080 may communicate with service applications through a virtual Internet Protocol (IP) and load balancer or other means that directs communication requests to designated endpoints in the cloud computing platform 1010. The components of cloud computing platform 1010 may communicate with each other over a network (not shown), which may include, without limitation, one or more local area networks (LANs) and/or wide area networks (WANs).

Having described various aspects of the distributed computing environment 1000 and cloud computing platform 1010, it is noted that any number of components may be employed to achieve the desired functionality within the scope of the present disclosure. Although the various components of FIG. 10 are shown with lines for the sake of clarity, in reality, delineating various components is not so clear, and metaphorically, the lines may more accurately be grey or fuzzy. Further, although some components of FIG. 10 are depicted as single components, the depictions are exemplary in nature and in number and are not to be construed as limiting for all implementations of the present disclosure.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for optimizing data transactions based on replicable differential store data structures, the system comprising:
a processor; and
an operations component of a replicable differential store data structure, operatively coupled to the processor, configured for:
executing a write operation, wherein executing the write operation comprises:
identifying a key and a key range partitioner in a write operation request, wherein the key range partitioner indicates a key range for partitioning an internal state of an index of the replicable differential store data structure into a plurality of sub-indexes;
accessing a write-set, a differential state, and a consolidated state related to the replicable differential store data structure,
wherein the write-set comprises an uncommitted write for the key based on the write operation request,
wherein the differential state comprises a result set of currently committing transactions,
wherein the consolidated state comprises a result set of previously committed transactions;
generating a redo instance, wherein the redo instance comprises redo information comprising instructions for performing an operation on a replica node to redo the write operation;
generating an undo instance, wherein the undo instance comprises undo information comprising instructions for performing an operation on a replica node to undo the write operation;
acquiring an intent write lock on the differential state with the result set of currently committing transactions;
acquiring a write lock on the key;
determining that the key has not been previously added to the index based on performing an extant inquiry operation, wherein the extant inquiry operation makes a determination whether the key has been previously added to the index;
communicating a replica operation instance comprising the redo instance and the undo instance such that the write operation is replicated to a replica node;
generating a transaction instance for the write-set, the transaction instance comprising a modification to the key; and
determining whether the write operation is aborted or committed, wherein when the write operation is aborted the replica operation instance and the transaction instance are discarded, and wherein when the write operation is committed, a result of the transaction instance is persisted in the differential state.

2. The system of claim 1, further comprising the operations component configured for executing a read operation, wherein executing the read operation comprises:
determining an isolation level for the read operation, the read operation comprising a key;
applying a plurality of isolation visibility rules for executing the read operation, wherein the isolation visibility rules correspond to the isolation level for the read operation;
retrieving a value for the key in the read operation, wherein the value of the key is retrieved based on referencing one or more of: the write-set, the differential state, and a consolidated state, wherein the consolidated state comprises a result set of previously committed transactions, wherein referencing the write-set, the differential state, and the consolidated state is based on an iteration operation that progressively references the write-set, the differential state, and the consolidated state to retrieve the key; and
communicating the value for the key.

3. The system of claim 1, wherein the write operation is executed on a primary replica node and a replica write operation is executed on a secondary replica node, wherein the replica write operation is executed based on a replica write operation instance, wherein executing the replica write operation comprises:
receiving the replica write operation instance; and
executing the write operation based on the redo instance, the write operation is executed without acquiring a lock on the key in the secondary replica node.

4. The system of claim 3, further comprising an operations component on the secondary replica node configured for executing a read operation, wherein executing the read operation comprises:

determining an isolation level for the read operation, the read operation comprising another key;

applying a plurality of isolation visibility rules for executing the read operation, wherein the isolation visibility rules correspond to the isolation level for the read operation;

retrieving a value for the another key in the read operation, wherein the value of the another key is retrieved from the write-set; and communicating the value for the key.

5. The system of claim 1, further comprising the operations component configured for executing a consolidation operation, wherein executing the consolidation operation comprises merging the differential state and a consolidated state to generate a new consolidated state.

6. The system of claim 1, further comprising the operations component configured for executing a checkpoint operation, wherein executing the checkpoint operation comprises writing one or more changes to an index of the replicable differential data structure such that the one or more changes in-memory are persisted in a storage component.

7. A computer-implemented method for optimizing data transactions based on replicable differential data stores, the method comprising:

accessing a write operation request, the write operation request having a key for a write operation on a replicable differential store data structure; and executing the write operation based on a write-set, a differential state, and a consolidated state related to the replicable differential store data structure, wherein the write-set comprises an uncommitted write to modify the key based on the write operation request, wherein the differential state comprises a result set of currently committing transactions, wherein the consolidated state comprises a result set of previously committed transactions, wherein executing the write operation further comprises:

acquiring an intent write lock on the differential state and a write lock on the key;

generating a transaction instance, the transaction instance comprising a modification to the key;

persisting the transaction instance to a result set of the transaction instance in the differential state; and merging the differential state and the consolidated state to a new consolidated state.

8. The method of claim 7, wherein upon accessing the write operation request, the method further comprises:

generating a replica operation instance for the write operation request, the replica operation instance having one or more instances comprising instructions for replication operations on a replica node;

communicating the replica operation instance such that the replica operation instance is executable on a replica node; and discarding the replica operation instance when the write operation is aborted.

9. The method of claim 8, wherein the replica operation instance comprises at least one of:

a redo instance, wherein the redo instance comprises redo information comprising instructions for a redo recovery operation to redo the write operation; or an undo instance, wherein the undo instance comprises undo information comprising instructions for an undo recovery operation to undo the write operation.

10. The method of claim 7, wherein the write operation request comprises the key and a key range partitioner, wherein the key range partitioner indicates a key range for partitioning an internal state of an index of the replicable differential store data structure into a plurality of sub-indexes, wherein the internal state comprises at least one of: the differential state and the consolidate state.

11. The method of claim 7, wherein the modification in the transaction instance corresponds to a type of write operation transaction, wherein an insert transaction corresponds to an inserted version;

an add transaction corresponds to an add version;

an update transaction corresponds to a version chain comprising a delete version and an inserted version; and a remove transaction corresponds to another deleted version.

12. The method of claim 7, wherein a commit transaction to commit the write operation comprises:

accessing a plurality of transaction instances including the transaction instance in the write-set;

persisting the plurality of transaction s instances in an in-memory portion of the replicable differential data structure;

releasing locks on one or more keys associated with the plurality of transaction instances; and emptying the write-set.

13. The method of claim 7, further comprising:

receiving an indication from a replicator component to checkpoint the differential state; and writing one or more changes to an index of the replicable differential data structure such that the one or more changes are persisted in a storage component.

14. The method of claim 7, wherein the intent write lock prevents clear operations on the index, and the write lock on the key prevents other writes from performing modifications on the key.

* * * * *